United States Patent
Furukawa et al.

[11] Patent Number: 6,098,420
[45] Date of Patent: Aug. 8, 2000

[54] ABSORPTION CHILLER AND HEAT EXCHANGER TUBE USED THE SAME

[75] Inventors: Masahiro Furukawa; Kazuyasu Iramina, both of Osaka-fu; Hiroyuki Takahashi; Chikara Saeki, both of Kanagawa-ken, all of Japan

[73] Assignee: Sanyo Electric Co., Ltd., Osaka-fu, Japan

[21] Appl. No.: 09/281,204

[22] Filed: Mar. 30, 1999

[30] Foreign Application Priority Data

Apr. 24, 1998 [JP] Japan .................................. 10-115398
Mar. 31, 1999 [JP] Japan .................................. 10-086027

[51] Int. Cl.⁷ .......................... F25B 15/12; F25B 15/00; F28F 1/42; F28F 13/18
[52] U.S. Cl. .............................. 62/484; 62/485; 165/133; 165/179
[58] Field of Search .............................. 62/476, 484, 494, 62/485; 165/133, 179, 184

[56] References Cited

U.S. PATENT DOCUMENTS

| | | | |
|---|---|---|---|
| 3,847,212 | 11/1974 | Withers et al. | 165/179 |
| 4,660,630 | 4/1987 | Cunningham et al. | 165/133 |
| 5,573,062 | 11/1996 | Ooba et al. | 165/177 |
| 5,590,711 | 1/1997 | Ishida et al. | 165/179 |
| 5,680,772 | 10/1997 | Furukawa et al. | 62/476 |
| 5,690,167 | 11/1997 | Rieger | 165/133 |

FOREIGN PATENT DOCUMENTS

| | | |
|---|---|---|
| 62-186179 | 8/1987 | Japan . |
| 62-206356 | 9/1987 | Japan . |
| 63-306370 | 12/1988 | Japan . |
| 2-176378 | 7/1990 | Japan . |
| 3-291495 | 12/1991 | Japan . |
| 7-71889 | 3/1995 | Japan . |
| 7-167530 | 7/1995 | Japan . |
| 8-159605 | 6/1996 | Japan . |
| 10-19414 | 1/1998 | Japan . |
| 10-267460 | 10/1998 | Japan . |
| 10-318691 | 12/1998 | Japan . |

OTHER PUBLICATIONS

Pending U.S. Patent Application No. 09/266,914 filed Mar. 12, 1999.

Primary Examiner—William Doerrler
Attorney, Agent, or Firm—Weingarten, Schurgin, Gagnebin & Hayes LLP

[57] ABSTRACT

An absorption chiller that uses an aqueous salt solution as an absorbent and water as a refrigerant, the absorption chiller including an evaporator that allows the water to trickle or flow downward onto the outer surface of a heat exchanger tube installed horizontally or approximately horizontally, an absorber that allows the aqueous salt solution to trickle or flow downward onto the outer surface of a heat exchanger tube installed horizontally or approximately horizontally, and a condenser that allows the water to be supplied onto the outer surface of a heat exchanger tube installed horizontally or approximately horizontally. At least one of the heat exchanger tubes is provided, on the inner surface thereof, with protruded threads formed in a spiral fashion. A plurality of rows of projections of a height of 0.2 to 0.4 mm with flat portions on the top is provided on the outer surface of the tube successively at a pitch of 0.4 to 0.8 mm between projections. The plurality of rows of projections is arranged in a spiral fashion in a direction opposite to that of the protruded threads and separated from each other at a pitch of 0.7 to 1.4 mm. Furthermore, the present invention provides the heat exchanger tube constructed in the forgoing manner.

24 Claims, 8 Drawing Sheets

ABSORPTION CHILLER AND HEAT EXCHANGER TUBE USED THE SAME

BACKGROUND OF THE INVENTION

1. Field of the Invention

The present invention relates to an absorption chiller that uses an aqueous salt solution as an absorbent, water as a refrigerant, comprising an evaporator, a condenser, and absorber having heat exchanger tubes, respectively, and more particularly, to heat exchanger tubes to be installed inside the evaporator, condenser, and absorber.

2. Background Art

Figure 14:
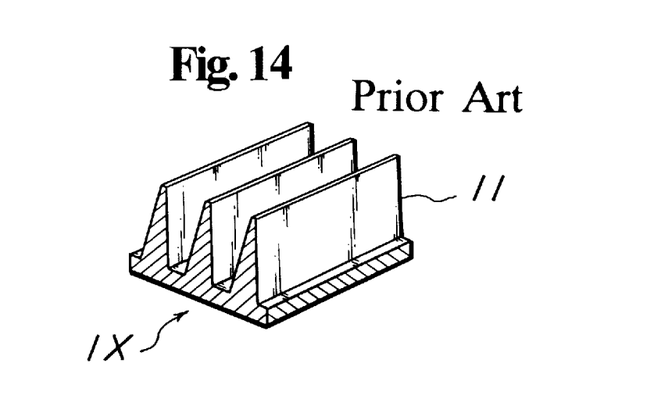
FIG. 14 is a partial view showing a conventional heat exchanger tube.
Figure 15:
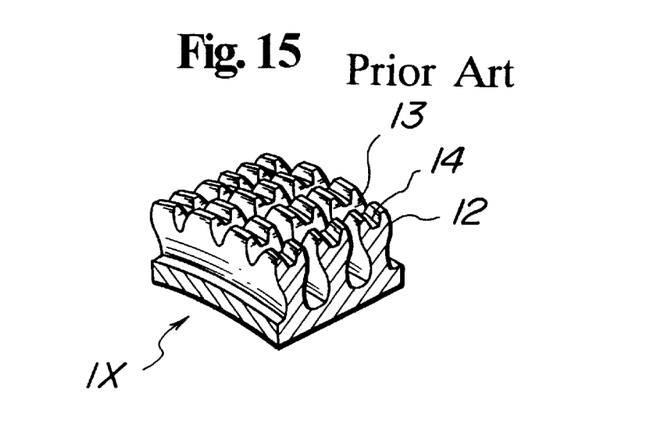
FIG. 15 is a partial view showing another conventional heat exchanger tube.

An absorption chiller generally allows an evaporator to exchange heat between brine flowing through a heat exchanger tube and refrigerant, and a condenser to exchange heat between cooling water flowing through a heat exchanger tube and refrigerant. Concave and convex features are provided on the outer surface of the heat exchanger tube for refrigerant to adhere and spread on the surface, and thus promote heat exchange between refrigerant and brine or cooling water flowing through the tubes. Projections, for example, shown in FIGS. 14 and 15, are known as concave and convex features. A heat exchanger tube 1X shown in FIG. 14 is provided, on the outer surface thereof, with mutually parallel fins 11. These fins serve to increase the outer surface area of the tube and thus improve the heat exchange property.

On the other hand, a heat exchanger tube 1X shown in FIG. 15 is provided with fins 12 in the same manner as fins 11 shown in FIG. 14. The fin 12 is provided, on a top thereof, with a first notch 13 that extends in the direction orthogonal to the direction of extension of the top of the fins. The fin 12 is also provided, on the top thereof, with a second notch 14 in such a manner that the apex is divided into two parts. This allows the surface area on the outer surface of the tube to increase more than that of the heat exchanger tube 1X shown in FIG. 14.

Some heat exchanger tubes have an increased surface area by providing the first notch 13 of the heat exchanger tube 1X shown in FIG. 15 at an angle of 40 to 60 degrees in the direction of extension of the top.

However, these heat exchanger tubes are only focused on increasing the surface area of the outer surface of the tube. For this reason, a large amount of liquid will make thicker layer in complicated deep concave portions outside the tube when refrigerant of water or absorbent are sprayed, trickled, or flown onto the heat exchanger tube in an absorption chiller that uses, for example, an aqueous salt solution such as lithium bromide as an absorbent and water as a refrigerant.

The refrigerant of water and absorbent thus thicker layer will become thermal resistance to deteriorate the heat transfer performance, so that this has given the problems that the function of evaporating refrigerant on the surface of the heat exchanger tube of the evaporator, the function of condensing steamed refrigerant on the surface of the heat exchanger tube of the condenser, and the function of absorbing refrigerant by means of absorbent on the surface of the heat exchanger tube of the absorber deteriorated respectively.

Also given has been another problem that building up of refrigerant of water or absorbent in concave portions caused liquid to spread on the outside the tube badly, so that a thick layer of water or absorbent built up outside the tube and thus deteriorated the heat transfer performance.

SUMMARY OF THE INVENTION

An object of the present invention is to provide an absorption chiller wherein the outside of the heat exchanger tube is so constructed as to increase the area that contributes to heat transfer; adherence and spreadability of liquid is ensured so that liquid adhered to the outside of the tube will not build up there and cause thermal resistance to increase in consideration of the properties of water to be used as refrigerant and absorbent, especially their surface tension; and heat exchange property is improved by adhering widely a thin layer of refrigerant of water and absorbent.

The present invention provides an absorption chiller that uses an aqueous salt solution as an absorbent and water as a refrigerant, comprising an evaporator that allows the water to trickle or flow downward onto an outer surface of a heat exchanger tube installed horizontally or approximately horizontally, an absorber that allows the aqueous salt solution to trickle or flow downward onto an outer surface of a heat exchanger tube installed horizontally or approximately horizontally, and a condenser that allows the water to be supplied onto the outer surface of a heat exchanger tube installed horizontally or approximately horizontally; wherein at least one of said heat exchanger tubes of the evaporator, absorber and condenser is provided, on an inner surface thereof, with protruded threads formed in a spiral fashion, a plurality of rows of projections of a height of 0.2 to 0.4 mm with flat portions on a top is provided on the outer surface of the tube successively at a pitch of 0.4 to 0.8 mm, and the plurality of rows of projections is arranged in a spiral fashion in the direction opposite to that of the protruded threads and separated from each other at a pitch of 0.7 to 1.4 mm.

According to the present invention, it is possible to increase the area for heat transfer by providing the heat exchanger tube, on the outer surface thereof, with a number of projections of predetermined dimensions. Simultaneously, with shallow concave portions provided on the outer surface of the tube, no liquid will build up excessively on the outer surface of the heat exchanger tube even when refrigerant (water) or absorbent that may have several times of surface tension compared with Freon is trickled onto a heat exchanger tube installed horizontally, and refrigerant is condensed.

Therefore, the heat exchanger tube allows the refrigerant (water) and absorbent adhered to the outer surface of the tube to be small in thermal resistance and thus provide a good heat exchange property between fluid such as water flowing inside the tube and the liquid adhered to the outer surface of the tube. Consequently, when used as a heat exchanger tube in an evaporator, the heat exchanger tube allows the refrigerant of water sprayed on the surface of the heat exchanger tube to take heat away from the water flowing inside the tube to cool down the water and the refrigerant of water to evaporate promptly.

Furthermore, when used as a heat exchanger tube in a condenser, the heat exchanger tube causes refrigerant vapor to transfer heat to the cooling water flowing inside the tube one after another and to condense and to flow downward promptly.

Furthermore, when used as a heat exchanger tube in an absorber, the heat exchanger tube allows dense absorbent to transfer heat promptly to the cooling water flowing inside the tube and thus to lower the temperature of the absorbent, and then the refrigerant vapor coming in vapor from an evaporator is readily absorbed by the dense absorbent whose temperature has been lowered and turns into rarefied liquid to flow downward promptly.

Therefore, the absorption chiller of the present invention provides a remarkable effect in making an evaporator, condenser, and absorber smaller in size, and in energy saving.

Furthermore, the present invention provides an absorption chiller wherein the projections formed on the outer surface of the heat exchanger tube are provided, on the top flat areas, with concave patterns or projections. This allows the area for heat transfer to increase.

In the present invention, from a viewpoint of heat transfer performance, the flat portions of the projections formed on the outer surface of the heat exchanger tube are preferably separated at intervals of 0.2 to 0.8 mm in the same row.

Furthermore, the projections formed on the outer surface of the heat exchanger tube are preferably arranged in such a manner that the rectangle of a projection has longer sides oriented in the circumferential direction.

Furthermore, in the present invention, a number of rows are preferably provided so that the maximum interval of rows of projections formed on the outer surface of the heat exchanger tube is 1.5 to 2.5 times the minimum interval.

Furthermore, the present invention provides an absorption chiller wherein the projections formed on the outer surface of the heat exchanger tube are formed in a spiral fashion opposite to the protruded threads with a lead angle of 50 degrees or less.

Furthermore, the present invention provides an absorption chiller wherein the projections formed on the outer surface of the heat exchanger tube are provided, on each top of the projections, with a polygonal plane having a side of a length of 0.2 to 0.4 mm, and each bottom polygonal plane of the projections has a side of a length of 0.4 to 0.7 mm.

Furthermore, the present invention provides an absorption chiller wherein the slope of a side plane facing the direction of the row arrangement of the projections formed on the outer surface of the heat exchanger tube is gentler than a side plane facing other direction. This construction also improves the both the effectiveness of liquid discharge and the spreadability of liquids on the outer surface of the tube.

In the present invention, the projections in adjacent rows in the axial direction of the heat exchanger tube are arranged preferably in a non-linear manner to each other. Additionally, the protruded threads on the inner surface of the heat exchanger tube are formed preferably in a height of 0.1 to 0.3 mm with a lead angle of 40 to 50 degrees.

Furthermore, in the present invention, the protruded threads on the inner surface of the heat exchanger tube preferably have inclined and approximately flat top portions.

Furthermore, the present invention provides a heat exchanger tube that is installed horizontally or approximately horizontally to exchange heat between a medium flowing inside the tube and another medium to be trickled, flown down, or supplied onto an outside of the tube; and wherein protruded threads are formed in a spiral fashion on an inner surface of the heat exchanger tube, a plurality of rows of projections of a height of 0.2 to 0.4 mm with flat portions on a top is provided on the outer surface of the tube successively at a pitch of 0.4 to 0.8 mm, and said plurality of rows of projections is arranged in a spiral fashion in the direction opposite to that of said protruded threads and separated from each other at a pitch of 0.7 to 1.4 mm.

The heat exchanger tube of the present invention is preferably provided, on the top flat portion of the projection formed on the outer surface of the heat exchanger tube, with concave patterns or projections.

Furthermore, the flat portions of the projections formed on the outer surface of the heat exchanger tube are separated preferably at an interval of 0.2 to 0.8 mm in the same row.

Furthermore, in the heat exchanger tube of the present invention, the projections formed on the outer surface of the heat exchanger tube are preferably arranged in such a manner that the rectangle of a projection has longer sides oriented in the circumferential direction.

Furthermore, in the heat exchanger tube of the present invention, the rows of projections formed on the outer surface of the heat exchanger tube are arranged preferably in such a manner that the maximum interval from one projection row to another is 1.5 to 2.5 times the minimum interval.

Furthermore, in the heat exchanger tube of the present invention, the projections formed on the outer surface of the heat exchanger tube are formed preferably in a spiral fashion opposite to the protruded threads with a lead angle of 50 degrees or less.

Furthermore, in the heat exchanger tube of the present invention, the projection formed on the outer surface of the heat exchanger tube is provided preferably, on the top of the projection, with a polygonal plane having a side of a length of 0.2 to 0.4 mm, and also with the bottom polygonal plane of the projection having a side of a length of 0.4 to 0.7 mm.

Furthermore, in the heat exchanger tube of the present invention, it is preferable that the slope of a side plane facing the direction of the row arrangement of the projections formed on the outer surface of the heat exchanger tube is gentler than a side plane facing other direction.

In the heat exchanger tube of the present invention, the projections, formed on the outer surface of the heat exchanger tube, in adjacent rows in the axial direction are arranged preferably in a non-linear manner to each other.

Furthermore, in the heat exchanger tube of the present invention, the protruded threads on the inner surface of the heat exchanger tube are formed preferably in a height of 0.1 to 0.3 mm with a lead angle of 40 to 50 degrees.

Furthermore, in the heat exchanger tube of the present invention, the protruded threads on the inner surface of the heat exchanger tube preferably have inclined and approximately flat top portions.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

A preferred embodiment of an absorption chiller of the present invention will be described with reference to FIGS. 1 to 13.

Figure 1:
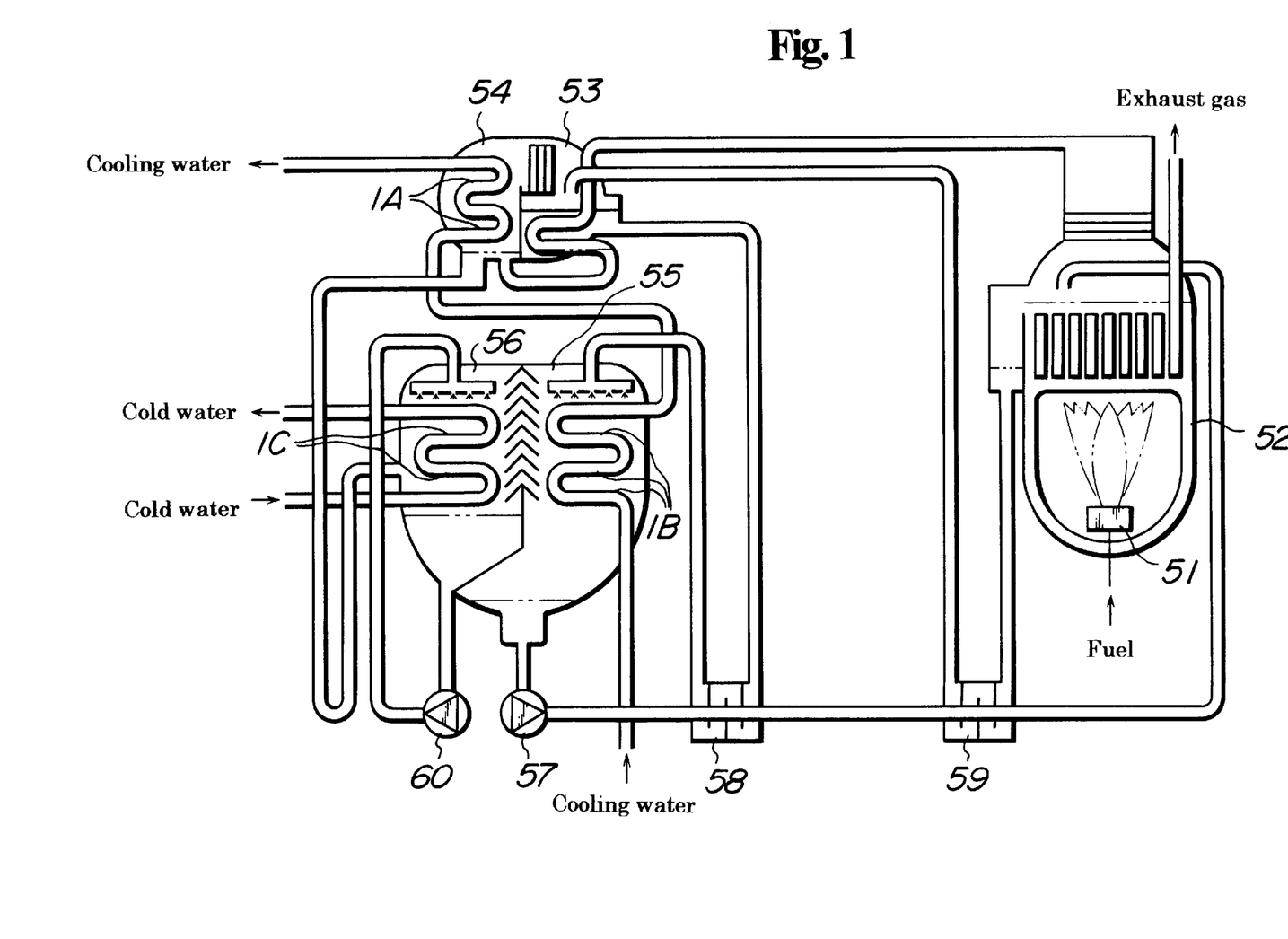
FIG. 1 is a schematic illustration showing a construction of an absorption chiller.

FIG. 1 is a schematic illustration showing a construction of an absorption chiller wherein an aqueous salt solution such as lithium bromide is used as an absorbent and water as a refrigerant. A high-temperature generator 52 provided with a heater 51 such as a burner heats up a mixture of the absorbent and refrigerant to separate the mixture into high-temperature refrigerant vapor. This high-temperature refrigerant vapor effects heating-up at a low-temperature generator 53 and then goes into a condenser 54 where the refrigerant vapor is cooled down to condense and liquefy by cooling water that has passed through an absorber 55.

This liquefied refrigerant is evaporated by heat of brine (such as cold water) that circulates through an objective load in an evaporator 56, thus vaporizing to cool down brine. The vaporized refrigerant is absorbed by a dense absorbent that is returned from the low-temperature generator 53 to rarefy in the absorber 55, fed again to the high-temperature generator 52 by an absorbent pump 57 to maintain the circulation of refrigerant as mentioned above.

The absorbent, from which refrigerant has been evaporated and separated in the high-temperature generator 52, now turned highly dense, performs heat exchange with the rarefied liquid introduced from the absorbent pump 57 at a high-temperature heat exchanger 59 and low-temperature heat exchanger 58. Furthermore, the absorbent performs heat exchange with refrigerant vapor at the low-temperature generator 53.

Furthermore, the condenser 54, absorber 55, and evaporator 56 are provided respectively with a plurality of heat exchanger tubes 1A, 1B, and 1C that are installed nearly horizontally as shown in FIG. 1. At the condenser 54, refrigerant is supplied to the heat exchanger tube 1A in the vaporized state. At the absorber 55, absorbent trickles or flows down to the heat exchanger tube 1B, while at the evaporator 56 refrigerant trickles or flows down to the heat exchanger tube 1C by means of a refrigerant pump 60.

Figure 2:
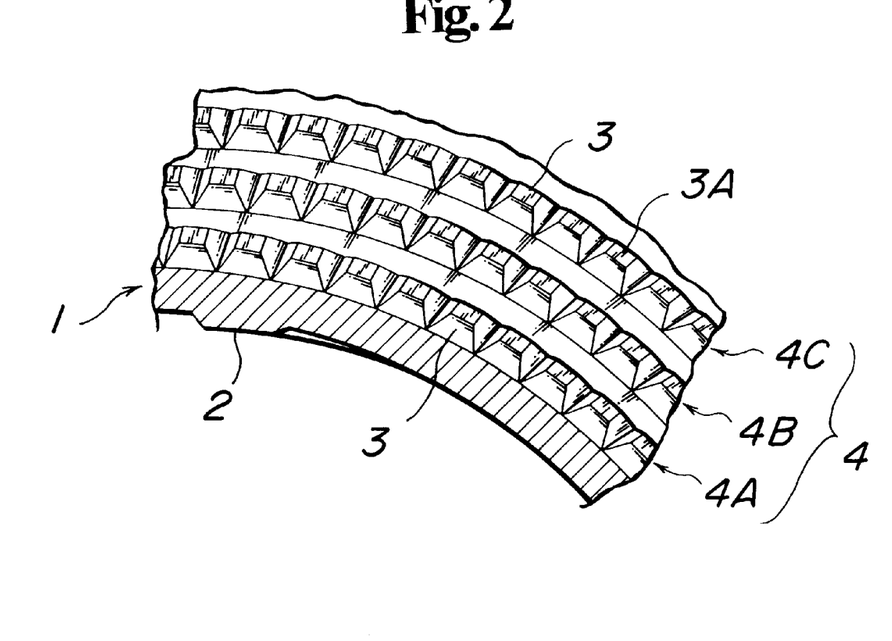
FIG. 2 is an explanatory drawing showing a detailed portion of a heat exchanger tube of a preferred embodiment of the present invention.
Figure 3:
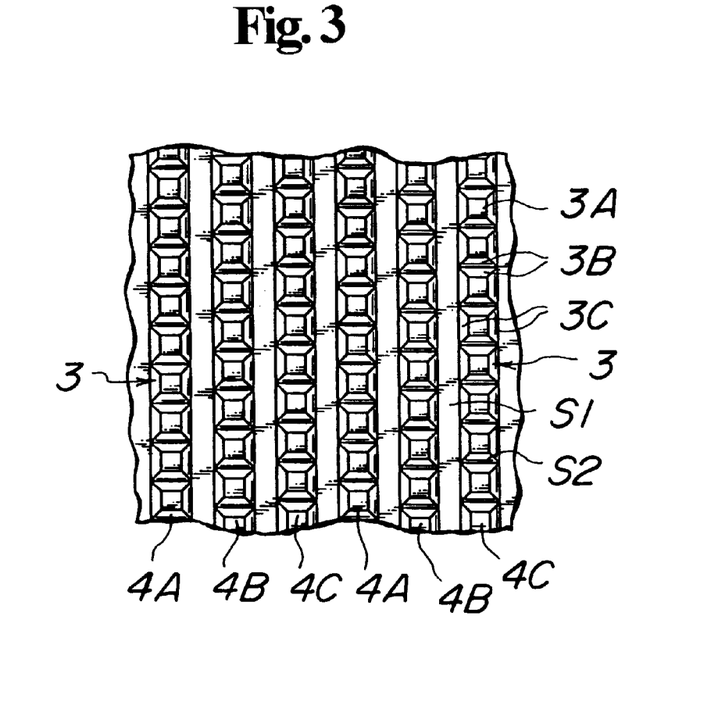
FIG. 3 is an explanatory drawing showing a detailed portion of the outer surface of the heat exchanger tube of a preferred embodiment of the present invention.

The absorption chiller according to the present invention is provided with the heat exchanger tubes 1A, 1B, and 1C, (to be hereafter shown without A, B, and C attached when installation positions are of no importance), the outer and inner surfaces of which are shaped as shown in FIGS. 2, 3, etc.

A heat exchanger tube 1 having such shape may be, for example, a phosphorus deoxidated copper tube (JISH3300, C1201-½H) of an outer diameter of 16 mm and a wall thickness of 0.7 mm. The tube is, on the outer surface thereof, rolled by a spiral fin in the axial direction of the tube at a constant pitch and pressed by a gear disk in the circumferential direction at a constant pitch. Thus, the tube is provided with independent spiral projections 3 on the outer surface of the tube. In addition, the tube is provided, on the inner surface thereof, with a mandrel having spiral grooves to form protruded spiral threads 2 at the same time the spiral projections 3 are formed on the outer surface of the tube.

A primary tube thereof is not limited to a phosphorus deoxidated copper tube, but may be of various materials such as copper alloy, lithium alloy, or steel. Furthermore, material temper is not limited to half hard (½H), but may be soft annealed (O).

The protruded threads 2 on the inner surface of the tube are arranged in parallel in a spiral fashion with a plurality of threads, for example, eight threads, provided at nearly equal intervals, for example, approximately at a pitch of 5.5 mm. Each protruded thread 2 is preferably formed with a lead angle of 40 to 50 degrees and with a height of 0.1 to 0.3 mm. Additionally, each protruded thread 2 preferably has an inclined and approximately flat top.

The values mentioned in the forgoing have been determined in consideration of the heat transfer performance and the path resistance when brine such as water, cooling water etc. (hereinafter simply called as brine etc.), flows through the heat exchanger tubes. To raise the heat transfer performance by reducing the pitch of the protruded thread 2 and by raising the height of the same, the flow rate of brine etc. may be reduced so that the brine etc. can be spread in between the protruded threads 2. However, this will cause the flow rate of the brine etc. per unit time to reduce, and thus enough flow rate and heat transfer volume cannot be ensured unless the equipment is made larger.

Furthermore, increasing the pitch and reducing the height may result in enough flow rate of brine etc. per unit time. However, this will cause the heat transfer volume to reduce, and thus enough heat mass cannot be supplied to loads unless, for example, the amount of circulation of brine to the objective load made sufficiently large.

Still furthermore, 40 degrees or less of the lead angle will cause brine etc. to stay shorter within heat exchanger tubes and thus the heat transfer volume to reduce. Additionally, a lead angle more than 50 degrees will cause the path resistance to increase and thus the heat transfer volume to reduce.

The heat exchanger tube 1 is provided, on the outer surface thereof, with rows 4 of projections, which comprise a plurality of projections 3 arranged in row at a pitch of 0.4 to 0.8 mm, in parallel in a spiral fashion. The rows 4 of projections consist of a plurality of rows, for example, three rows of 4A, 4B, and 4C, each arranged in parallel at a pitch of 0.7 to 1.4 mm. The rows 4 of projections formed on the outer surface (outside the tube) of the heat exchanger tube 1 are formed in a spiral fashion in the opposite direction against the protruded threads 2 formed on the inner surface (inside the tube) of the heat exchanger tube 1.

Thus, intersecting the flows of refrigerant (water) or absorbent and brine etc. with each other inside and outside the tube will allow the heat transfer volume to increase.

Figure 7:
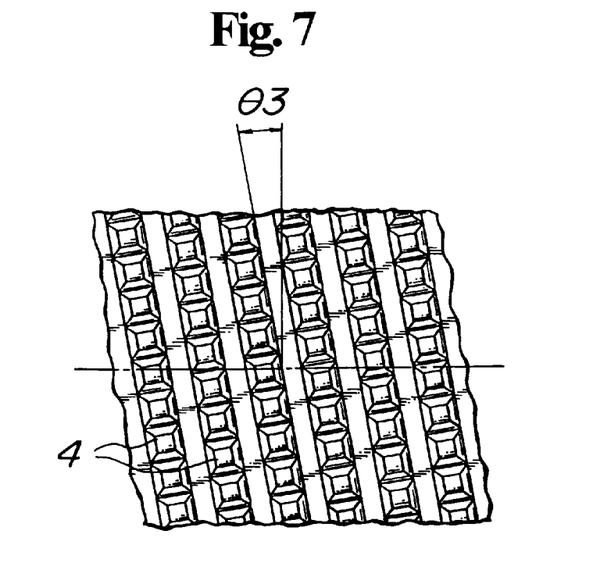
FIG. 7 is an explanatory drawing showing a detailed portion of the outer surface of the heat exchanger tube of a preferred embodiment of the present invention.

Particularly, as shown in FIG. 7, making the lead angle θ3 of the rows 4 of projections zero degree or larger and 50 degrees or smaller will provide advantages of ensuring both the effectiveness of liquid discharge (without thickening the layer of water or absorbent) and the spreadability of liquids.

Figure 4:
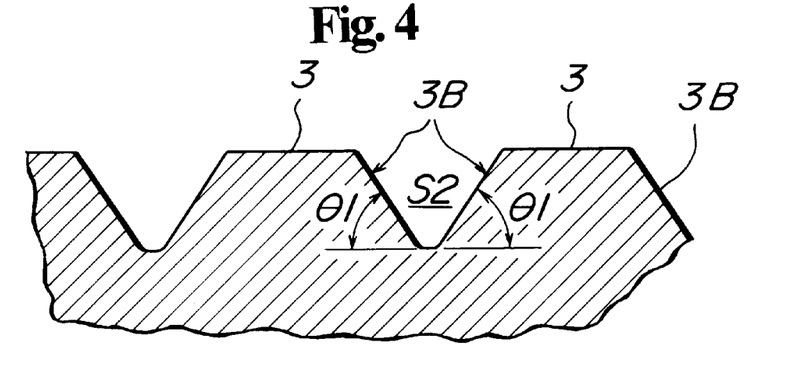
FIG. 4 is a cross-sectional view showing a detailed-portion of projections of the heat exchanger tube of a preferred embodiment of the present invention.

In this case, each projection 3 is formed into a shape similar to a flat-headed quadrangular pyramid that is the lower part of a quadrangular pyramid when the upper portion of the quadrangular pyramid is cut off by a plane parallel to the bottom face of the quadrangular pyramid whose top is located immediately above the bottom face of the rectangle. In this flat-headed quadrangular pyramid, one side of the base portion may preferably has a length of 0.4 to 0.7 mm with one side of the top portion 3A being preferably 0.2 to 0.4 mm. The shape of the projections is not limited to the above, but may be in a shape of a polygonal one.

In the relationship between the areas of the base portion and the top portion thus determined, a decrease in the area of the top portion 3A will cause the area of the top ends of the projections to decrease. This will allow the refrigerant (water) or absorbent around the top ends of the projections to flow easily into clearances between the projections 3, resulting in an increase in the thickness of the layer of a liquid that exists between projections and thus a decrease in performance. On the other hand, an increase in the area of the top portion 3A will cause the clearances between the projections 3 to become relatively narrower, and thus liquid can no longer widely spread.

Figure 5:
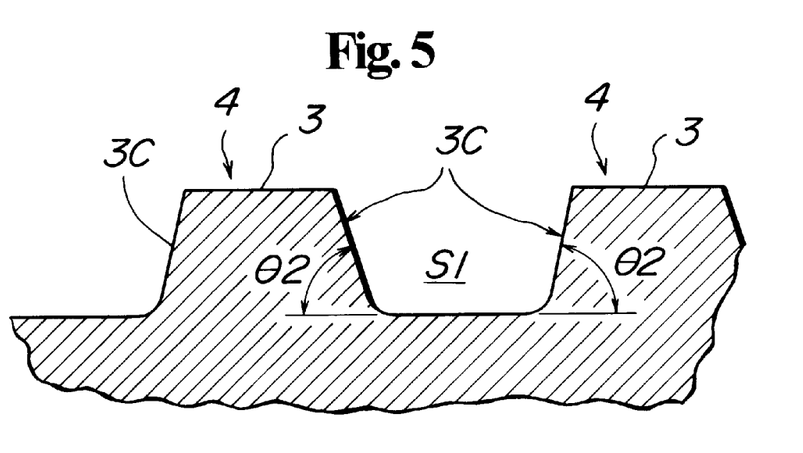
FIG. 5 is a cross-sectional view showing a detailed-portion of projections of the heat exchanger tube of a preferred embodiment of the present invention.
Figure 6:
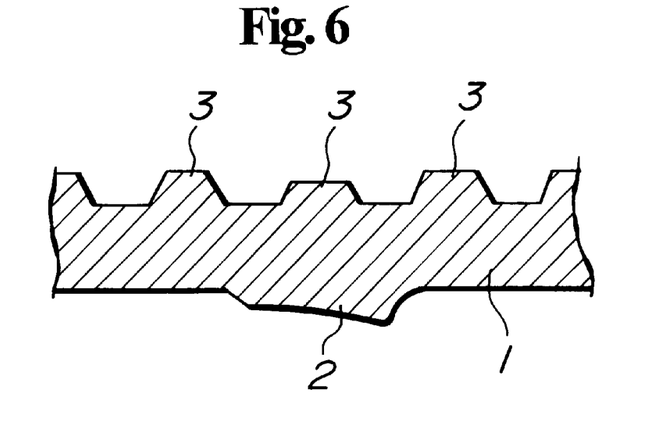
FIG. 6 is a cross-sectional view showing a detailed-portion of projections of the heat exchanger tube of a preferred embodiment of the present invention.

Furthermore, a slope 3B of each projection 3, which is oriented in the direction of the row arrangement of the projection 3, may preferably have an angle of inclination θ1 equal to 35 to 65 degrees. In addition, a slope 3C, which is oriented in the direction of the parallel arrangement of the projection rows 4, may preferably have an angle of inclination θ2 equal to 60 to 90 degrees, thus the slope 3B is smaller in angle than the slope 3C.

Therefore, the slope 3C facing a space S1 of the projections 3 introduces refrigerant (water) and absorbent into the space S1 more rapidly. On the other hand, the slope 3B facing a space S2 of the projections 3 introduces refrigerant (water) and absorbent into the space S2 slower than the slope 3C. Therefore, the liquid outside the tube is introduced into the space S1 mainly via the top portion 3A, the slope 3B, and the space S2 of the projections 3.

Furthermore, the height of the projection 3 may be preferably equal to 0.2 to 0.4 mm. Additionally, the projection 3 formed on the outer surface of the tube, corresponding to the portion where the protruded thread 2 is formed on the inner surface thereof, may be preferably formed to be slightly lower, for example, by approximately 0.1 mm at maximum, than the projection 3 formed in other portion.

Still furthermore, although all the projection rows 4A, 4B, and 4C are formed by arranging the projections 3 in row at the same pitch, the projections 3 of adjacent rows 4 of projections are arranged with a phase difference of ⅓ to each other as shown in FIG. 3. This allows the projections of adjacent rows 4 of projections to be non-linearly arranged to each other.

In the heat exchanger tube 1 constructed as mentioned in the forgoing, the area for heat transfer is increased by providing with a plurality of projections 3 of predetermined dimensions on the outer surface of the tube. However, no concave portions are formed on the outer surface of the tube with space between projections 3 being wider outside. This will not permit refrigerant (water) or absorbent, which has surface tension several times greater than Freon, to stay excessively on the outer surface of the heat exchanger tube 1 even when the refrigerant (water) or absorbent are adhered to the surface with the heat exchanger tube 1 installed horizontally.

To prevent water and absorbent having large surface tension from staying excessively on the outer surface of the heat exchanger tube 1, the projection 3 must not be made higher than 0.4 mm. Additionally, the projections 3 may not be preferably arranged in row at a pitch smaller than 0.4 mm and the projection rows 4 in parallel at a pitch smaller than 0.7 mm, neither.

On the other hand, making the projections lower than 0.2 mm or arranging the same in row at a pitch larger than 0.8 mm, and arranging the projection rows 4 in parallel at a pitch larger then 1.4 mm will readily prevent water and absorbent from excessive sticking thereof to the tube. However, this will cause the area of the outer surface of the heat exchanger tube 1 to be excessively reduced and result in a decrease in heat transfer performance and thus is not preferable.

The top portions 3A of the adjacent projections 3 of each row 4 of projections on the heat exchanger tube 1 may be preferably arranged at intervals of 0.2 to 0.8 mm. This is to prevent water and absorbent having large surface tension from staying excessively on the outer surface of the heat exchanger tube 1 and the heat transfer performance from deteriorating due to an excessive decrease in the area of the outer surface.

The heat exchanger tube 1 is used after a hydrophilic treatment such as a degreasing treatment, which is conventionally well known, has been performed.

The above construction allows refrigerant (water) and absorbent trickled on the outer surface of the heat exchanger tube 1 and water droplets condensed on the outer surface of the heat exchanger tube 1 to come in between the projections 3, going through the wide U-shaped spaces S1 surrounded by the oppositely located slopes 3C, dropping downward due to the effect of gravity, and at the same time partially going through the V-shaped spaces S2 surrounded by the oppositely located slopes 3B to spread transversely. The height of the projection 3 is limited to 0.4 mm or lower, so that liquid goes over the projections 3 without difficulty to spread downward or transversely when too much liquid sticks to the tube.

The U-shaped space S1, formed in between the rows 4 of projections, is formed in the spiral direction opposite to that of the protruded threads 2 that are provided to give a rotational force to the brine etc. flowing through the heat exchanger tube 1 so that the water can be agitated to keep the heat balance thereof always constant. Thus, the brine etc. flowing through the heat exchanger tube 1 flows oppositely to refrigerant (water) and absorbent flowing downward through the U-shaped space S1, giving higher heat exchange property than a heat exchanger tube wherein liquids inside and outside the tube rotate to flow in the same direction.

The protruded threads 2, formed on the inner surface of the heat exchanger tube 1, having a lead angle smaller than 40 degrees, have less effect of rotation and agitation on the brine etc. flowing through the inside of the tube even if the height of the threads is 0.3 mm. On the other hand, a lead angle of the protruded threads 2 above 50 degrees provides greater effect of agitation on flowing brine etc., but the path resistance of brine etc. becomes excessively large even if the height of the threads 2 is made equal to 0.1 mm. Therefore, the lead angle may be preferably made 40 to 50 degrees.

Furthermore, the protruded threads 2 are formed approximately in a flat shape to prevent an increase in wall thickness of the tube, so that the portion of the protruded thread 2 formed has a good heat transfer performance. In addition, the approximately flat top portion of the protruded threads 2 is inclined. Thus, allowing brine etc. to flow from lower side in the direction of going over the protruded threads 2 will reduce the path resistance, while allowing brine etc. to flow from higher side in the direction of going over the protruded threads 2 will strengthen the effect of agitation.

Furthermore, refrigerant (water) and absorbent flowing through the V-shaped spaces S2 to spread in the transverse direction spread not in the immediate transverse direction but in a spiral fashion and thus mix well with liquid at different heights because the spaces S2 are arranged non-linearly. This provides an effect of averaging temperature and thus higher heat transfer performance than a heat exchanger tube constructed so that liquid spreads only in the immediate transverse direction.

Furthermore, the projections 3 on the outer surface at the portion where the protruded threads 2 are formed on the inner surface are kept lower than the projections 3 located at other portions. Thus, an increase in thickness of the portion is not allowed, so that the portion gives a higher heat transfer performance than a heat exchanger tube having all projections 3 of the same height does.

In the case where the heat exchanger tube 1 that has the above construction is provided horizontally, for example, inside the evaporator 56 of an absorption chiller that uses a refrigerant (water) of large surface tension or salt absorbent as a refrigerant, and is sprayed with refrigerant of water from upward, a thin layer of water will adhere to the outer surface of the heat exchanger tube 1 and keep the thermal resistance of the tube small. Thus, the refrigerant of water adhered to the outer surface of the heat exchanger tube 1 can carry heat away from liquid such as brine etc. flowing in the tube and evaporate promptly.

Figure 8:
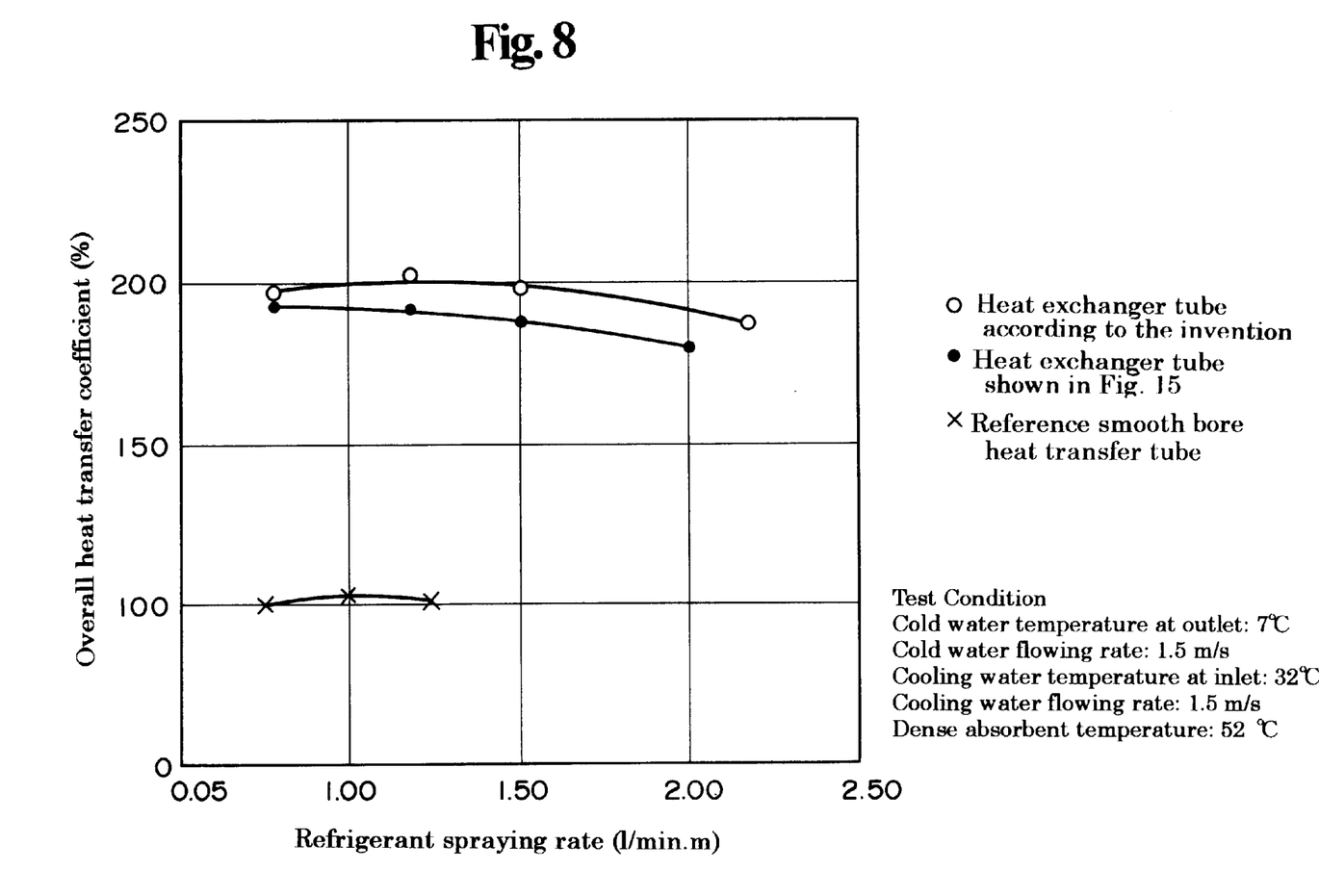
FIG. 8 is a graph illustrating the relationship between the overall heat transfer coefficient of a conventional heat exchanger tube provided for an evaporator and that of the heat exchanger tube of the present invention.

FIG. 8 shows the comparison of the overall heat transfer coefficient of the heat exchanger tube of the present invention with that of the conventional heat exchanger tube of the shape shown in FIG. 15 when used as a heat exchanger tube of an evaporator. This is based on the assumptions that a heat exchanger tube with no projections provided on the outer surface thereof is the heat exchanger tube 1C of the evaporator 56 and an overall heat transfer coefficient of 100% is given when refrigerant is sprayed to the heat exchanger tube 1 at a rate of 0.5 l/min.m. The heat exchanger tube of the present invention has, for example, the construction wherein the protruded threads 2 of a height of 0.2 mm are formed on the inner surface of the tube at a lead angle of 43 degrees; and a plurality of projection rows 4, which are formed by arranging in rows the projections 3 having the flat top portion 3A with a rectangle of a length of 0.3 mm and a height of 0.3 mm in a spiral fashion in the direction opposite to said protruded threads at a lead angle of 3 degrees and at a pitch of 0.6 mm, is arranged in a plurality of rows 4 at a pitch of 0.9 mm. The result of this comparison test clearly shows that the heat exchanger tube of the present invention has improved the overall heat transfer coefficient compared with a heat exchanger tube with no projections provided on the outer surface of the tube and the heat exchanger tube of the shape shown in FIG. 15.

Furthermore, in the case where the heat exchanger tube 1 of the present invention of the above construction is installed horizontally inside the condenser 54 of the absorption chiller to condense water vapor of refrigerant vapor by absorbing heat by with cooling water flowing through the inside thereof, refrigerant of water that has been condensed by transferring heat to the cooling water flowing inside the tube will not build up excessively on the surface of the tube 1 as thermal resistance. Therefore, the refrigerant vapor will transfer heat one after another to cooling water flowing inside the tube to condense, and this condensed water will flow downward promptly because of shallow grooves provided on the outer surface of the tube.

Also in the case where the heat exchanger tube 1 of the present invention of the above construction is installed horizontally inside the absorber 55 of the absorption chiller to spray dense absorbent supplied from the low-temperature regenerator 53 downward onto the tube, a thin layer of the dense absorbent will adhere to the outer surface of the heat exchanger tube 1 to keep the thermal resistance low. For this reason, the dense absorbent adhered to the outer surface of the heat exchanger tube 1 will carry heat from liquid such as cooling water flowing inside the tube to lower the temperature. The dense absorbent whose temperature has been lowered will absorb the refrigerant vapor fed in vapor from the evaporator 56. Then, the rarefied liquid produced on the outer surface of the tube by absorbing the refrigerant will flow downward promptly because of shallow grooves on the outer surface of the tube.

Figure 9:
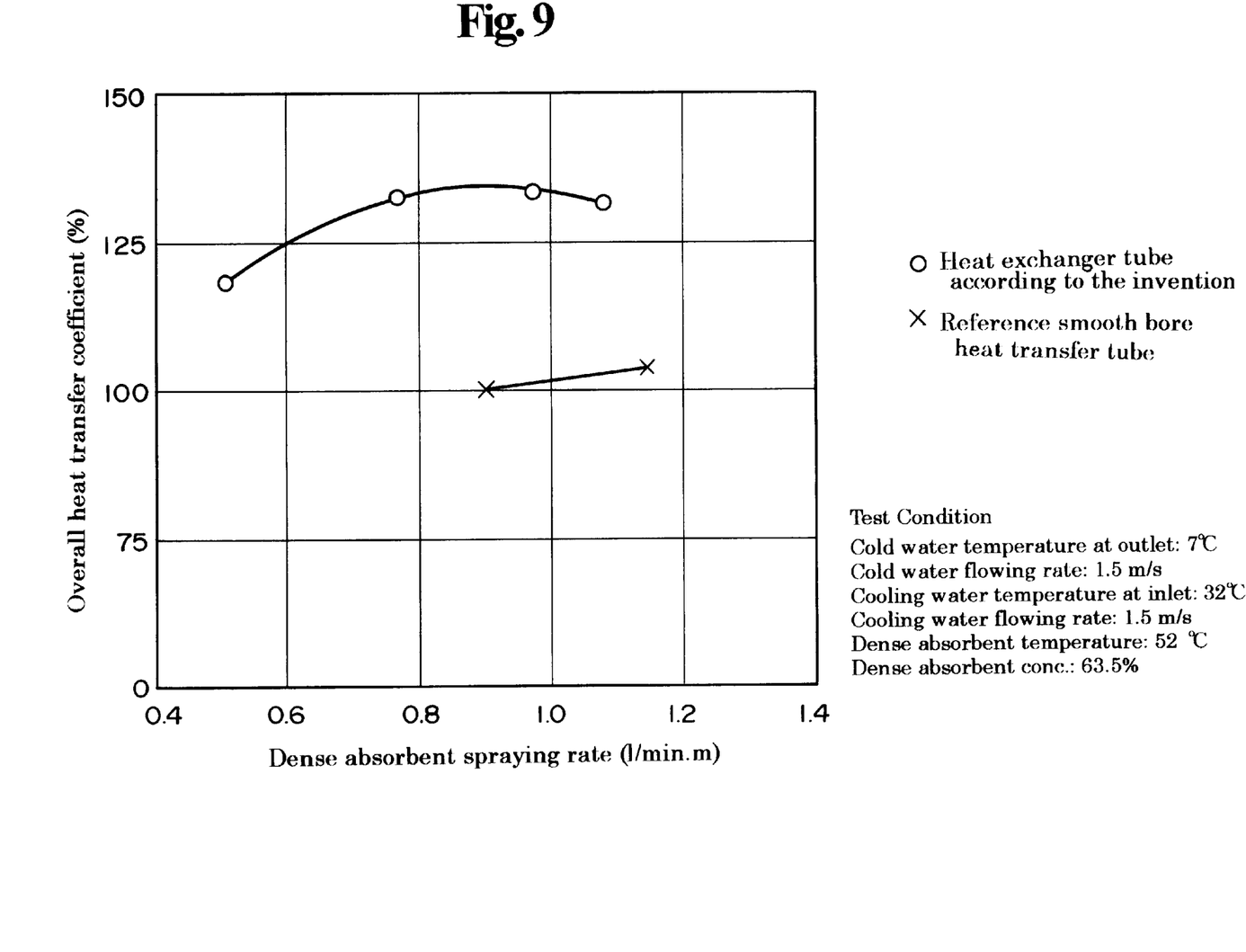
FIG. 9 is a graph illustrating the relationship between the overall heat transfer coefficient of a smooth tube provided for an absorber and that of the heat exchanger tube of the present invention.

FIG. 9 shows the result of the comparison of the overall heat transfer coefficient of the heat exchanger tube of the present invention as mentioned in the experiment shown in said FIG. 8 with that of a heat exchanger tube having no projections on the outer surface of the tube when used as a heat exchanger tube of an absorber. This is based on the assumptions that a heat exchanger tube with no projections provided on the outer surface thereof is the heat exchanger tube 1B of the absorber 55 and an overall heat transfer coefficient of 100% is given when absorbent is sprayed to the heat exchanger tube 1B at a rate of 0.9 l/min.m. The result of this experiment clearly shows that the heat exchanger tube of the present invention has greatly improved the overall heat transfer coefficient compared with a heat exchanger tube with no projections provided on the outer surface of the tube.

Figure 10:
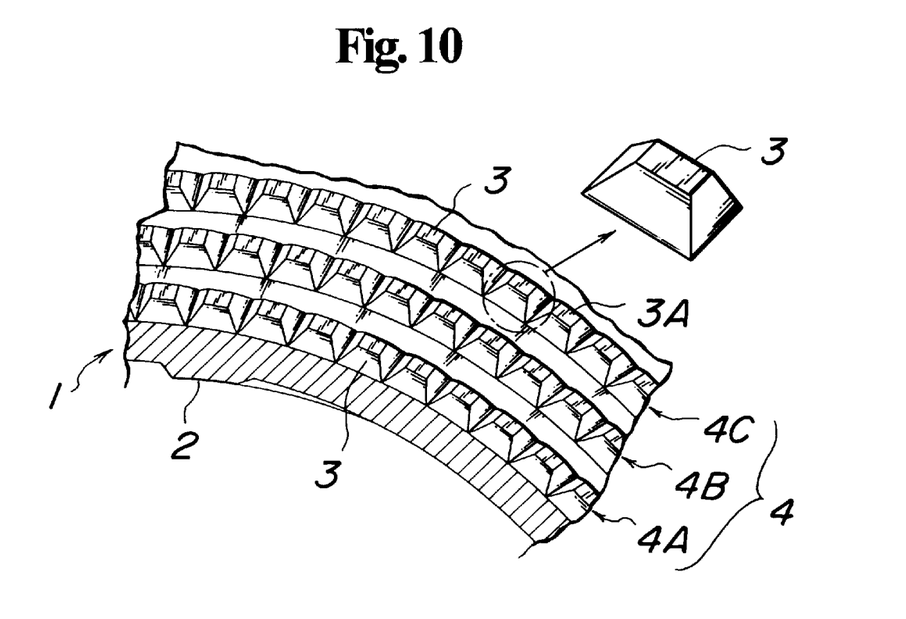
FIG. 10 is an explanatory drawing showing a detailed portion of the outer surface of the heat exchanger tube of a preferred embodiment of the present invention.

The projections 3 of the heat exchanger tube 1 may be given such a shape as is similar to a flat-headed quadrangular pyramid that is the lower part of a quadrangular pyramid when the upper portion of the quadrangular pyramid is cut off by a plane parallel to the bottom face of the quadrangular pyramid whose top is located immediately above the bottom face of the rectangle having a long side, for example, longer than the short side by 1.5 to 2.5 times; and may be arranged in such a manner that the long side locates along the direction of the row arrangement of the projections 3 as shown in FIG. 10 and the short side along the direction of parallel arrangement of the projection rows 4.

Figure 11:
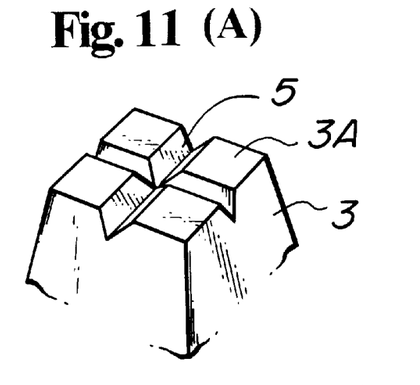
FIGS. 11(A), 11(B), and 11(C) are views showing projections of the heat exchanger tube of preferred embodiments of the present invention.

Heat transfer performance can be further improved by providing the top portion 3A of the projection 3 of the heat exchanger tube 1 with, for example, a cross-shaped concave portion 5 shown in FIG. 11 (A) and (B), and a semi-spherical concave portion 5 shown in FIG. 11 (C) to increase the surface area of the projections 3. These concave portions 5 may preferably have a depth ranging, for example, from 20 to 90% of the height of top portion 3A.

Figure 12:
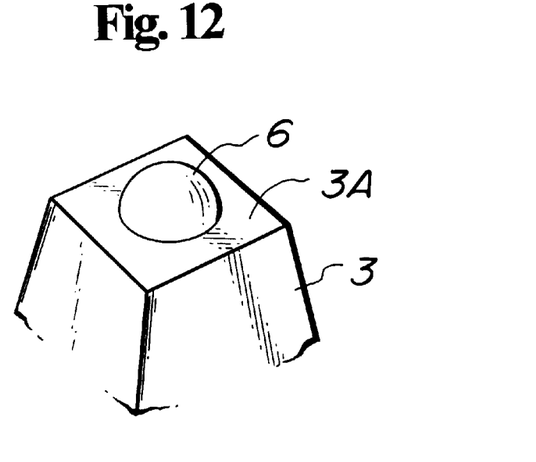
FIG. 12 is a view showing a projection of the heat exchanger tube of a preferred embodiment of the present invention.

It is also possible to increase the surface area of the projections 3 by providing the top portion 3A of the projection 3 of the heat exchanger tube 1 with a semi-spherical projected portion 6 shown in FIG. 12 in a range, for example, 20 to 90% of the height of top portion 3A.

Figure 13:
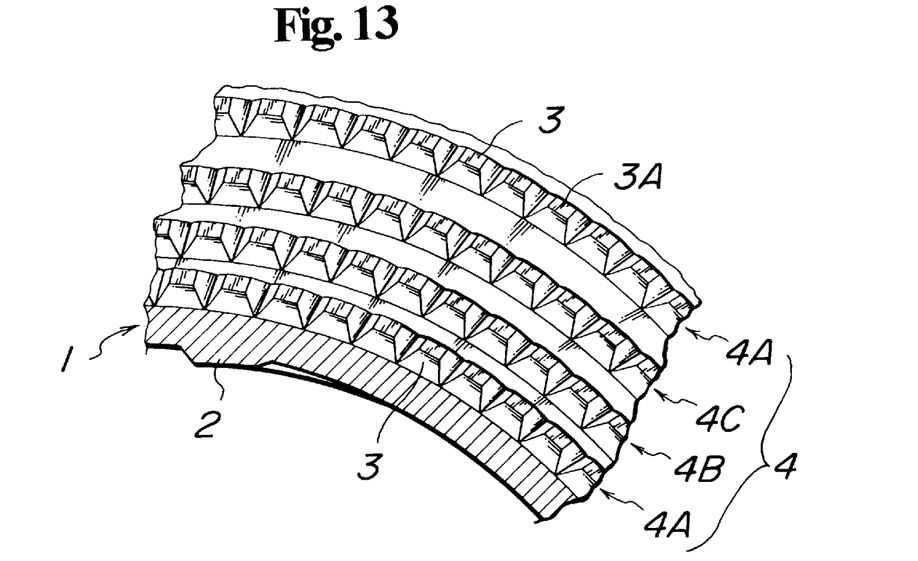
FIG. 13 is an explanatory drawing showing a detailed portion of the outer surface of the heat exchanger tube of a preferred embodiment of the present invention.

As shown in FIG. 13, the projection rows 4 to be provided on the outer surface of the heat exchanger tube 1 may be preferably arranged in such a manner that the maximum interval from one projection row to another is 1.5 to 2.5 times the minimum interval. For example, the projection rows 4A and 4B may be arranged at an interval of 0.15 mm, the projection rows 4B and 4C at an interval of 0.25 mm, and the projection rows 4C and the next row 4A at an interval of 0.35 mm.

A ratio of 1.5 to 2.5 between the maximum and minimum interval between projection rows 4, or the width of the U-shaped space S1, will make the force for holding refrigerant (water) and absorbent adhered to the outer surface of the tube uneven in the axial direction of the heat exchanger tube 1 and thus make the speed of downward flow uneven. This provides an advantage that the liquids spread irregularly in the transverse direction and will have an averaged thermal distribution of the liquids on the outer surface of the tube.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. An absorption chiller that uses an aqueous salt solution as an absorbent and water as a refrigerant; said absorption chiller comprising an evaporator that allows said water to trickle or flow downward onto an outer surface of a heat exchanger tube installed horizontally or approximately horizontally, an absorber that allows said aqueous salt solution to trickle or flow downward onto an outer surface of a heat exchanger tube installed horizontally or approximately horizontally, and a condenser that allows said water to be supplied onto an outer surface of a heat exchanger tube installed horizontally or approximately horizontally; wherein at least one of said heat exchanger tubes of the evaporator, absorber and condenser is provided, on an inner surface thereof, with protruded threads formed in a spiral fashion, a plurality of rows of projections of a height of 0.2 to 0.4 mm with a flat portion formed on each top of projections is provided on the outer surface of the heat exchanger tube successively at a pitch of 0.4 to 0.8 mm between the projections, and said plurality of rows of projections is arranged in a spiral fashion in a direction opposite to that of said protruded threads and separated from each other at a pitch of 0.7 to 1.4 mm.

2. An absorption chiller as set forth in claim 1, wherein a concave pattern or projection is provided on each top flat portion of the projections formed on the outer surface of said heat exchanger tube.

3. An absorption chiller as set forth in claim 1, wherein the flat portions of projections formed on the outer surface of said heat exchanger tube are separated at an interval of 0.2 to 0.8 mm in one row.

4. An absorption chiller as set forth in any one of claim 1, wherein the projections formed on the outer surface of said heat exchanger tube have a shape of rectangle with longer sides oriented in a circumferential direction.

5. An absorption chiller as set forth in any one of claim 1, wherein a number of rows are arranged so that the maximum interval between rows of the projections formed on the outer surface of said heat exchanger tube is 1.5 to 2.5 times the minimum interval.

6. An absorption chiller as set forth in any one of claim 1, wherein the projections formed on the outer surface of said heat exchanger tube are formed in a spiral fashion opposite to said protruded threads with a lead angle of 50 degrees or less.

7. An absorption chiller as set forth in claim 4, wherein the projections formed on the outer surface of said heat exchanger tube are provided, on each top of the projections, with a polygonal plane having sides of a length of 0.2 to 0.4 mm, and each bottom polygonal plane of said projections has sides of a length of 0.4 to 0.7 mm.

8. An absorption chiller as set forth in claim 4, wherein the slope of a side plane facing the direction of the row arrangement of the projections formed on the outer surface of said heat exchanger tube is gentler than a side plane facing other direction.

9. An absorption chiller as set forth in claim 1, wherein the projections, formed on the outer surface of said heat exchanger tube, in adjacent rows in the axial direction are arranged in a non-linear manner to each other.

10. An absorption chiller as set forth in claim 1, wherein the protruded threads on the inner surface of the heat exchanger tube have a height of 0.1 to 0.3 mm with a lead angle of 40 to 50 degrees.

11. An absorption chiller as set forth in claim 1, wherein the protruded threads on the inner surface of the heat exchanger tube have inclined and approximately flat top portions.

12. A heat exchanger tube installed horizontally or approximately horizontally to exchange heat between a medium flowing inside the heat exchanger tube and a medium to be trickled, flown down, or supplied onto the outside of the heat exchanger tube; wherein protruded threads are formed in a spiral fashion on the inner surface of the heat exchanger tube, a plurality of rows of projections of a height of 0.2 to 0.4 mm with a flat portion on the tops is provided on the outer surface of the heat exchanger tube successively at a pitch of 0.4 to 0.8 mm between projections, and said plurality of rows of projections is arranged in a spiral fashion in the direction opposite to that of said protruded threads and separated from each other at a pitch of 0.7 to 1.4 mm.

13. A heat exchanger tube as set forth in claim 12, wherein a concave pattern or projection is provided on each top flat portion of the projections formed on the outer surface of said tube.

14. A heat exchanger tube as set forth in claim 12, wherein the flat portions of the projections formed on the outer surface of said tube are separated at an interval of 0.2 to 0.8 mm in one row.

15. A heat exchanger tube as set forth in claim 12, wherein the projections formed on the outer surface of said tube have a shape of rectangle with longer sides oriented in a circumferential direction.

16. A heat exchanger tube as set forth in claim 12, wherein a number of rows are arranged so that the maximum interval between rows of the projections formed on the outer surface of said tube is 1.5 to 2.5 times the minimum interval.

17. A heat exchanger tube as set forth in claim 12, wherein the projections formed on the outer surface of said tube are formed in a spiral fashion opposite to said protruded threads with a lead angle of 50 degrees or less.

18. A heat exchanger tube as set forth in claim 15, wherein the projections formed on the outer surface of said tube are provided, on each top of the projections, with a polygonal plane having sides of a length of 0.2 to 0.4 mm, and each bottom polygonal plane of said projections has sides of a length of 0.4 to 0.7 mm.

19. A heat exchanger tube as set forth in claim 15, wherein the slope of a side plane facing the direction of the row arrangement of the projections formed on the outer surface of said tube is gentler than a side plane facing other direction.

20. A heat exchanger tube as set forth in any one of claims 12–19, wherein the projections, formed on the outer surface of said tube, in adjacent rows in the axial direction are arranged in a non-linear manner to each other.

21. A heat exchanger tube as set forth in claim 12, wherein the protruded threads on the inner surface of the tube have a height of 0.1 to 0.3 mm with a lead angle of 40 to 50 degrees.

22. A heat exchanger tube as set forth in claim 12, wherein said protruded threads on the inner surface of the tube have inclined and approximately flat top portions.

23. An absorption chiller as set forth in claim 2, wherein:

the flat portions of projections formed on the outer surface of said heat exchanger tube are separated at an interval of 0.2 to 0.8 mm in one row;

the projections formed on the outer surface of said heat exchanger tube have a shape of rectangle with longer sides oriented in a circumferential direction;

a number of rows are arranged so that the maximum interval between rows of the projections formed on the outer surface of said heat exchanger tube is 1.5 to 2.5 times the minimum interval;

the projections formed on the outer surface of said heat exchanger tube are formed in a spiral fashion opposite to said protruded threads with a lead angle of 50 degrees or less;

the projections formed on the outer surface of said heat exchanger tube are provided, on each top of the projections, with a polygonal plane having sides of a length of 0.2 to 0.4 mm, and each bottom polygonal plane of said projections has sides of a length of 0.4 to 0.7 mm;

the slope of a side plane facing the direction of the row arrangement of the projections formed on the outer surface of said heat exchanger tube is gentler than a side plane facing other direction;

the projections, formed on the outer surface of said heat exchanger tube, in adjacent rows in the axial direction are arranged in a non-linear manner to each other;

the protruded threads on the inner surface of the heat exchanger tube have a height of 0.1 to 0.3 mm with a lead angle of 40 to 50 degrees; and the protruded threads on the inner surface of the heat exchanger tube have inclined and approximately flat top portions.

24. A heat exchanger tube as set forth in claim 13, wherein:

the flat portions of the projections formed on the outer surface of said tube are separated at an interval of 0.2 to 0.8 mm in one row;

the projections formed on the outer surface of said tube have a shape of rectangle with longer sides oriented in a circumferential direction;

a number of rows are arranged so that the maximum interval between rows of the projections formed on the outer surface of said tube is 1.5 to 2.5 times the minimum interval;

the projections formed on the outer surface of said tube are formed in a spiral fashion opposite to said protruded threads with a lead angle of 50 degrees or less;

the projections formed on the outer surface of said tube are provided, on each top of the projections, with a polygonal plane having sides of a length of 0.2 to 0.4 mm, and each bottom polygonal plane of said projections has sides of a length of 0.4 to 0.7 mm;

the slope of a side plane facing the direction of the row arrangement of the projections formed on the outer surface of said tube is gentler than a side plane facing other direction;

the projections, formed on the outer surface of said tube, in adjacent rows in the axial direction are arranged in a non-linear manner to each other;

the protruded threads on the inner surface of the tube have a height of 0.1 to 0.3 mm with a lead angle of 40 to 50 degrees; and said protruded threads on the inner surface of the tube have inclined and approximately flat top portions.

* * * * *

UNITED STATES PATENT AND TRADEMARK OFFICE
CERTIFICATE OF CORRECTION

PATENT NO. : 6,098,420
DATED : August 8, 2000
INVENTOR(S) : Masahiro Furukawa et al.

Page 1 of 1

It is certified that error appears in the above-identified patent and that said Letters Patent is hereby corrected as shown below:

Title page,
Item [30], "Mar. 31, 1999" should read -- Mar. 31, 1998 --;

Column 3,
Line 34, "the both the" should read -- both the --;
Line 34, "effactiveness" should read -- effectiveness --;

Column 7,
Line 13, "has" should read -- have --;

Column 8,
Line 16, "then" should read -- than --;

Column 9,
Line 65, "heat by with" should read -- heat with --;

Column 11, claim 4,
Line 55, "any one of claim 1" should read -- claim 1 --;

Column 11, claim 5,
Line 59, "any one of claim 1" should read -- claim 1 --;

Column 11, claim 6,
Line 64, "any one of claim 1" should read -- claim 1 --; and Column 13, claim 20,
Lines 1 and 2, "any one of claims 12-19" should read -- claim 12 --.

Signed and Sealed this

Sixteenth Day of April, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.      : 6,098,420
DATED           : August 8, 2000
INVENTOR(S)   : Masahiro Furukawa et al.

It is certified that error appears in the above-identified patent and that said Letters Patent is hereby corrected as shown below:

<u>Title page,</u>
Item [73], Assignee, "Sanyo Electric Co., Ltd.," should read -- Sanyo Electric Co., Ltd., and Kobe Steel Ltd. --;

Signed and Sealed this

Fifteenth Day of July, 2003

JAMES E. ROGAN
*Director of the United States Patent and Trademark Office*